March 12, 1963 S. PAYNE 3,080,906
ANTISKID SHOE
Filed April 2, 1962
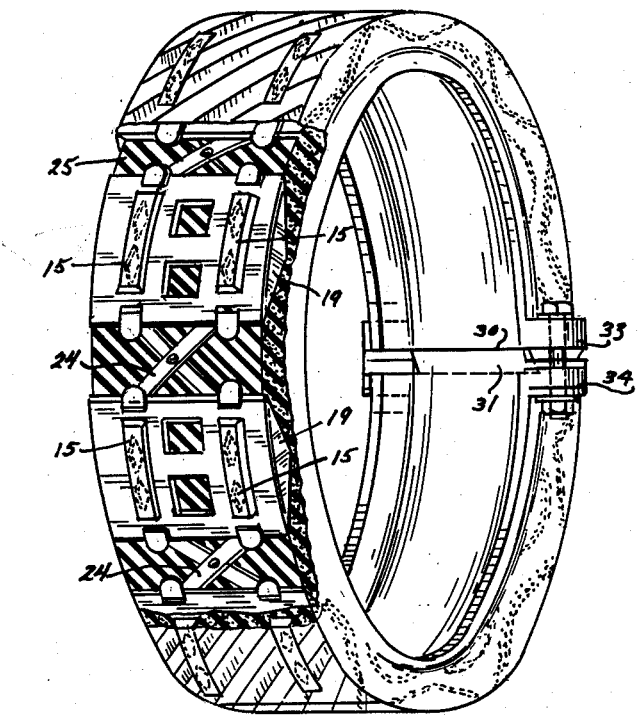
Fig. 1
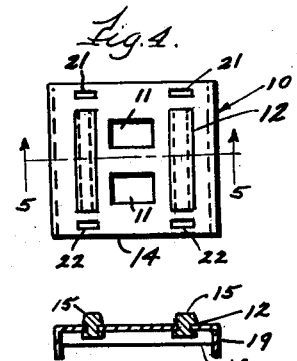
Fig. 4
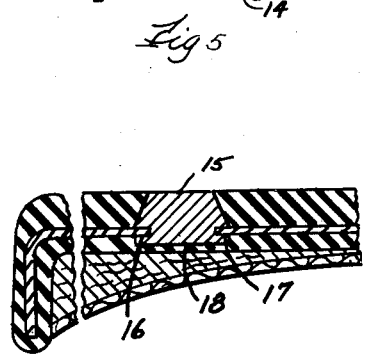
Fig. 5
Fig. 6
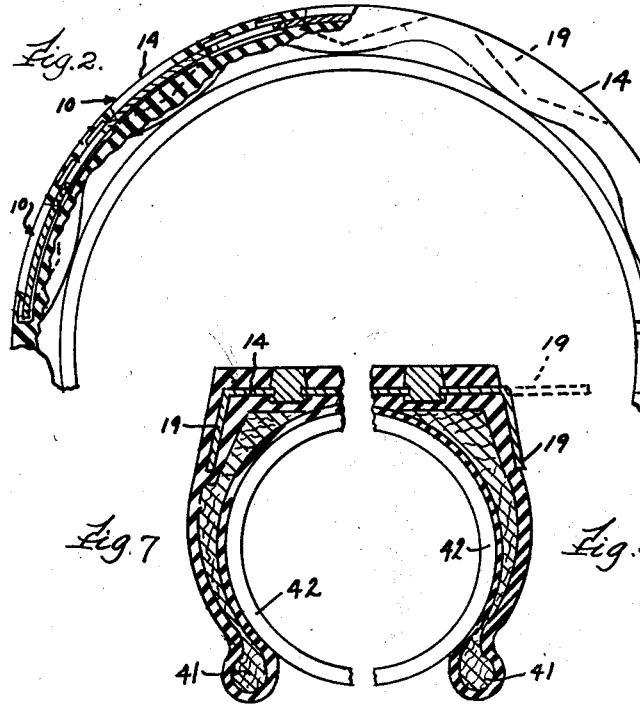
Fig. 2
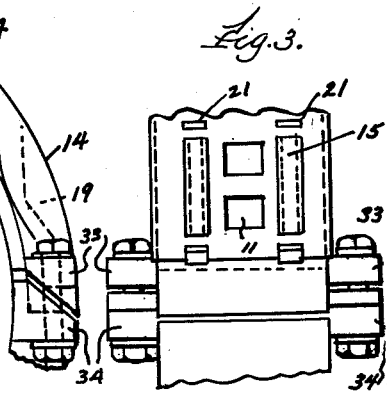
Fig. 3
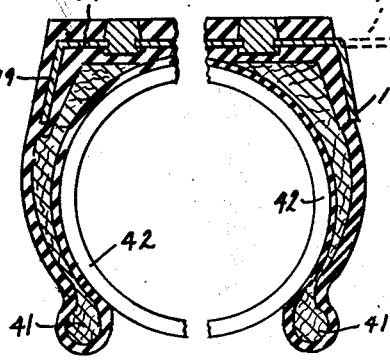
Fig. 7   Fig. 8
Inventor.
Sumas Payne,

United States Patent Office 3,080,906
Patented Mar. 12, 1963

3,080,906
ANTISKID SHOE
Sumas Payne, 8522 S. Maryland Ave., Chicago 19, Ill.
Filed Apr. 2, 1962, Ser. No. 184,234
3 Claims. (Cl. 152—175)

This invention relates to improvements in traction devices known as anti-skid shoes.

It is an object of the present invention to provide anti-skid shoes for which tires particularly adapted for use when traveling over icy roads or wet pavements.

Another object of the present invention is to provide an arrangement of shoes which increases the tractive efforts of motor vehicles over a variety of terrain and which is adapted to simply encircle individual rubber tired wheels used therewith.

Still another object of the present invention is to provide a traction device in combination with a pneumatic tire casing comprising an auxiliary tread member adapted to be placed in position and secured upon the tire casing in position against movement relative to the tire casing.

Still another object is to provide an auxiliary tread member having a series of anti-skid shoes embedded in the tread member and adapted to limit the circumference of the tread member when it is installed in position on a tire casing.

Still a further object is to provide a traction device that may be readily and easily embedded within the tread of a tire casing while it is being molded, forming a "non-skid" type of pneumatic casing.

And still a further object is to provide an auxiliary tread member with downwardly curved sides, so as to partially over-lap the tire casing, the auxiliary tread having enlarged ear portions at the ends thereof which are perforated and through which bolt type fastening means may secure the ends of the tread together and forming an endless traction device, and when the tire casing is fully inflated the tread member will be held against sideward movement, due to the pressure within the tire casing.

Other objects relate to various other forms of construction and arrangement which will be set out more fully hereinafter.

The nature of the invention will be understood from the following specification taken with the accompanying drawings in which certain embodiments are illustrated.

In the drawings:

FIGURE 1 is a general perspective view of my substitute tire tread, with parts broken away, showing a specific embodiment of my invention, to be applied on a tire casing;

FIGURE 2 is an enlarged side view of the tire tread shown in FIG. 1, in fragmentary form and partly in section;

FIGURE 3 is a fragmentary end view of the locking portion of the tire tread shown in FIG. 2;

FIGURE 4 is a top plan view of one of the anti-skid shoe units;

FIGURE 5 is a transverse sectional view of the anti-skid shoe taken on line 5—5 of FIG. 4;

FIGURE 6 is an enlarged fragmentary sectional view of the shoe shown in FIG. 5 embedded in a supplemental tire tread;

FIGURE 7 is a fragmentary transverse sectional view of a tire casing with the anti-skid shoe embedded therein; and FIGURE 8 is a fragmentary transverse sectional view of a tire casing with the anti-skid shoe secured therewith and the metal end tab of the shoe bent downwardly upon the side wall thereof, the dotted lines showing the position of the tab prior to being formed downwardly and upon the tire casing.

The several parts of the anti-skid shoe device may be of any suitable tough, strong, flexible materials, and the relative sizes and proportions of the structural features may be varied to a considerable extent without departing from the spirit of the invention, hereinafter more fully set forth and specifically claimed.

As shown specifically in FIG. 4, the main anti-skid shoe unit 10 consists of a unitary steel plate 14 with a plurality of perforations. There are two rectangular perforations 11 arranged transversely, and two rectangular perforations 12 arranged longitudinally of the plate 14, said perforations 12 having a steel traction member 15 arranged in each one thereof. The steel traction member 15 is substantially of keystone configuration in transverse cross section, having longitudinal grooves 16 and 17 arranged longitudinally in the side surfaces thereof and adjacent the bottom surface 18. The traction members 15 are inserted within the perforations 12 of the plate 14 with the side edges of the plate extending into the grooves 16 and 17; the bottom edge portions of the traction members are then peened into tight engagement with the plate 14. Each plate 14 has a depending triangular shaped side member 19, its function to be described later on in the specification. The end edges of the plate 14 are each provided with two transverse slots 21 on one end and slots 22 on the other end, these slots 21 and 22 arranged for receiving the cross-links 24 arranged between each anti-skid shoe when assembled together. The ends of the cross-links 24 are inserted through the slots 21 and 22 and bent backwards upon themselves forming a hook on each link.

As clearly shown by FIGURE 1, ten or more anti-skid shoes may be assembled together forming a cage-like structure, made in sections, which co'lectively are embedded within a tire tread and thereafter embrace a pneumatic tire casing and provide adequate traction for the tire casing. The cage structure can be embedded within a tire casing if desired.

When the cage-like structure, embodying a plurality of anti-skid shoes and cross-links are embedded in a tire tread as shown by FIGURES 1, 2, 3, and 6, the anti-skid shoe may be referred to as a saddle, each shoe comprising a plate portion adapted to extend across the face of a tread 25 and formed on opposite sides with the inwardly-projecting triangular shaped side members 19, said members 19 being embedded in the tread and preventing transverse movement of the shoe.

The free ends 30 and 31 of the tread 25 are each provided on opposite transverse sides with enlarged lug portions 33 and 34, each formed with a bore for the insertion of a bolt 40, by which the free ends of the tread are secured together forming an endless tire tread. It is obvious from the above description that the tire tread with its ends free can be assembled upon a tire casing and then secured thereto by drawing the ends of the tread together and bolting them in place upon the said casing.

The dotted lines shown in FIGURE 2, extending about the periphery of the tread, clearly shows the arrangement of the shoes 10 embedded therein and held in position by cross-links 24, thereby forming an endless traction device with depending triangular shaped side members 19. The bolt 40 is also shown dotted and extending through lug portions 33 and 34.

FIGURE 3 showing a fragmentary portion of the bolted ends of the tire tread, clearly shows the novel manner of securing the ends together.

FIGURE 7 shows the anti-skid device molded into a tire casing when the casing is processed. The triangular shaped side plate is embedded within the rubber of the side wall of the casing. The casing is shown with parts broken away and only showing the normal bead 41 and inner tube 42.

FIGURE 8 shows the anti-skid device, similar to FIG. 7, but having the triangular side portions of the shoe extending outwardly, as shown by numeral 19, when the shoe is embedded in the casing, the side 19 is later pressed downwardly into juxtaposition with the tire and held exteriorly of the side wall thereof.

It is to be understood that if the shoe 10 is to be made in one piece, the plate 14 and friction bar members 15 can be molded or cast as a unitary device; this would eliminate the assembly of the bar members 15 into the rectangular holes 12 and then secured therein by peening the edges of the plate 14.

The required number of devices may be employed to encircle the tire, the shoes and links embedded into a tread and readily applied and removed from a tire; the bolts are applied to the end portions of the tread and removed without any trouble. The saddles are generally formed from cast or sheet metal, and will withstand any strain imposed upon them by the cross-links. The anti-skid shoes provide a firm grip to the casing itself if embedded therein, or to the casing tread on icy or muddy roads. The bars 15 co-act with rubber portions of the tire or tread which protrude upwardly through the openings 11 in the saddles to prevent slipping sidewise, as well as to assist in giving the tires firm grip upon the road.

It is obvious that the ice shoes may be assembled into a rubber attachment which will act as an anti-skid cover for tires, or they may be assembled directly into the tire casing.

The same anti-skid shoes may be assembled into rubber as a safety device for persons walking under similar circumstances, such as on icy or muddy pavements.

The anti-skid device may be manufactured with two or more contact anti-skid shoes which may be arranged horizontally, vertically or staggered at various degrees.

I believe it is new in my invention to provide a construction of the character set forth in which a tire is employed and having an auxiliary tread to provide for the usual wear and strain as well as preventing skidding of the wheels of the vehicle.

The anti-skid device will prevent the possibility of the vehicle, having its tires so covered, from skidding beyond control. The device will also act to prevent the vehicle from becoming trapped in snow drifts, or when parked along the curbs in the city. This device is a fuel saving device since it eliminates the spinning of the wheels of the vehicle in snow, mud or upon wet pavements.

Having thus described my invention, I do not wish to be restricted to the exact construction shown, but wish to cover those modifications thereof which will occur to those skilled in the art.

I claim:

1. An anti-slipping device for vehicle tires, comprising a one piece tire tread including a plurality of metal saddles embedded therewith and connected by metal cross-links and forming an endless traction means when the opposite ends of the one piece tread are bolted together, said saddle including a surface plate with openings and with friction members therein, and having inwardly-projecting side members of triangular configuration, cross-links with ends thereof connected with two adjoining saddles, the tire tread having lugs at the ends thereof with openings, and bolts assembled through the openings to join the ends together.

2. In a pneumatic tire having a transversely rounded periphery, a separable tread member having a concave inner surface corresponding with said transversely rounded periphery of said tire and adapted to be secured thereto, a plurality of metal saddle members disposed in said tread member, a plurality of metal cross-bars disposed in said tread member, one of said cross-bars arranged between each two adjoining saddles, and secured therewith whereby an endless metal cage is formed in the tread, said saddles having metallic friction bars assembled therewith and extending above the external upper surface of said separable tread member.

3. In a pneumatic tire as claimed in claim 2 wherein said saddles have centrally arranged opening therein whereby the surface of said tread member can protrude therethrough when in use to assist in locking said tread with said tire.

References Cited in the file of this patent

UNITED STATES PATENTS

| | | |
|---|---|---|
| 1,127,339 | Wise et al. | Feb. 2, 1915 |
| 1,448,150 | Raymond et al. | Mar. 13, 1923 |
| 2,143,523 | Poe | Jan. 10, 1939 |
| 2,481,308 | Goff | Sept. 16, 1949 |
| 2,571,020 | Earl | Oct. 9, 1951 |
| 2,947,337 | Ambeau | Aug. 2, 1960 |